(12) United States Patent
Horizoe et al.

(10) Patent No.: US 9,777,232 B2
(45) Date of Patent: Oct. 3, 2017

(54) SYSTEM AND METHOD FOR RECOVERING GAS CONTAINING $CO_2$ AND $H_2S$

(71) Applicant: MITSUBISHI HEAVY INDUSTRIES, LTD., Tokyo (JP)

(72) Inventors: Kouji Horizoe, Tokyo (JP); Yuudai Katou, Tokyo (JP); Moritoshi Murakami, Tokyo (JP); Masaki Yushima, Hiroshima (JP); Kazuo Ishida, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 81 days.

(21) Appl. No.: 14/762,525

(22) PCT Filed: Jan. 22, 2014

(86) PCT No.: PCT/JP2014/051282
§ 371 (c)(1),
(2) Date: Jul. 22, 2015

(87) PCT Pub. No.: WO2014/129255
PCT Pub. Date: Aug. 28, 2014

(65) Prior Publication Data
US 2015/0361363 A1    Dec. 17, 2015

(30) Foreign Application Priority Data
Feb. 21, 2013    (JP) .................... 2013-032642

(51) Int. Cl.
*C10K 1/00* (2006.01)
*B01D 53/14* (2006.01)
(Continued)

(52) U.S. Cl.
CPC .......... *C10K 1/004* (2013.01); *B01D 53/1425* (2013.01); *B01D 53/1462* (2013.01);
(Continued)

(58) Field of Classification Search
CPC ..................................................... Y02C 10/06
See application file for complete search history.

(56) References Cited

U.S. PATENT DOCUMENTS

| | | | |
|---|---|---|---|
| 3,725,529 A * | 4/1973 | Giammarco | B01D 53/1425 423/223 |
| 4,052,176 A * | 10/1977 | Child | B01D 53/1406 252/373 |

(Continued)

FOREIGN PATENT DOCUMENTS

| | | |
|---|---|---|
| CN | 102641653 A | 8/2012 |
| CN | 102671510 A | 9/2012 |

(Continued)

OTHER PUBLICATIONS

Office Action dated Aug. 2, 2016, issued in counterpart Japanese Patent Application No. 2013-032642, with English translation. (5 pages).

(Continued)

*Primary Examiner* — Imran Akram
(74) *Attorney, Agent, or Firm* — Westerman, Hattori, Daniels & Adrian, LLP

(57) ABSTRACT

The system includes: an absorber which brings an introduction gas into contact with an absorbent that absorbs $CO_2$ and $H_2S$; an absorbent regenerator which releases $CO_2$ or the like to regenerate the absorbent; a second supply line which returns a regenerated absorbent to the absorber from the regenerator; a third supply line which extracts a semi-rich solution from the vicinity of a middle stage of the absorber, and introduces the semi-rich solution to the vicinity of the middle stage of the regenerator; and a semi-rich solution heat exchanger which is interposed at an intersection between the third supply line and the second supply line to perform the heat exchange between the semi-rich solution and the lean solution.

1 Claim, 3 Drawing Sheets

(51) Int. Cl.
*C10K 1/08* (2006.01)
*C01B 17/16* (2006.01)

(52) U.S. Cl.
CPC ........ B01D 53/1493 (2013.01); C01B 17/167 (2013.01); C10K 1/005 (2013.01); C10K 1/08 (2013.01); *B01D 2252/204* (2013.01); *B01D 2257/304* (2013.01); *B01D 2257/504* (2013.01); *Y02C 10/06* (2013.01); *Y02P 20/152* (2015.11)

(56) References Cited

U.S. PATENT DOCUMENTS

| | | | | |
|---|---|---|---|---|
| 4,324,567 A * | 4/1982 | Ranke | ................... | B01D 53/14 95/161 |
| 4,609,389 A * | 9/1986 | Karwat | .................. | B01D 53/14 62/625 |
| 2006/0043000 A1* | 3/2006 | Gaskin | ............... | B01D 53/1425 208/177 |
| 2006/0110300 A1* | 5/2006 | Mak | ................... | B01D 53/1456 62/625 |
| 2006/0286017 A1* | 12/2006 | Hakka | ................ | B01D 53/1475 423/220 |
| 2010/0083696 A1* | 4/2010 | Hoang-Dinh | ...... | B01D 53/1425 62/611 |
| 2010/0101416 A1* | 4/2010 | Akiyama | ........... | B01D 53/1425 95/193 |
| 2011/0120315 A1* | 5/2011 | Iijima | ................ | B01D 53/1406 96/242 |
| 2013/0192470 A1* | 8/2013 | Iijima | ................ | B01D 53/1425 96/242 |
| 2013/0247755 A1* | 9/2013 | Horizoe | ............. | B01D 53/1462 95/8 |
| 2014/0369913 A1* | 12/2014 | Nakamura | ............ | B01D 53/62 423/220 |

FOREIGN PATENT DOCUMENTS

| | | | |
|---|---|---|---|
| JP | 55-111821 | A | 8/1980 |
| JP | 60-153920 | A | 8/1985 |
| JP | 62-39825 | U | 3/1987 |
| JP | 8-48984 | A | 2/1996 |
| JP | 11-267442 | A | 10/1999 |
| JP | 2010-120013 | A | 6/2010 |
| JP | 2012-020265 | A | 2/2012 |
| JP | 2012-110835 | A | 6/2012 |
| JP | 2013-226476 | A | 11/2013 |
| WO | 2012070304 | A1 | 5/2012 |
| WO | WO 2013161100 A1 * | 10/2013 | ............. B01D 53/62 |

OTHER PUBLICATIONS

Written Opinion dated Apr. 22, 2014, issued in International Application No. PCT/JP2014/051282, with English translation.(5 pages).
International Search Report dated Apr. 22, 2014, issued in counterpart application No. PCT/JP2014/051282 (1 page).
Written Opinion of the International Searching Authority dated Apr. 22, 2014, issued in counterpart application No. PCT/JP2014/051282 (4 pages).
Office Action dated Mar. 3, 2016, issued in counterpart Chinese Patent Application No. 201480005716.9, with English translation. (23 pages).
Notice of Acceptance dated Nov. 2, 2016, issued in counterpart Australian Application No. 2014220049. (2 pages).
Decision to Grant a Patent dated Dec. 6, 2016, issued in counterpart Japanese Application No. 2013-032642, with machine tranlsation. (5 pages).

* cited by examiner

SYSTEM AND METHOD FOR RECOVERING GAS CONTAINING $CO_2$ AND $H_2S$

FIELD

The present invention relates to a recovery system and method of a gas containing $CO_2$ and $H_2S$ for efficiently recovering $H_2S$ from $CO_2$ and $H_2S$ contained in a gasified gas that is obtained, for example, by gasifying a coal, a biomass or the like by a gasification furnace.

BACKGROUND

As a technique for removing an acid gas such as $CO_2$ and $H_2S$ contained in the gasified gas obtained by gasifying the coal, the biomass or the like in the gasification furnace, conventionally, a chemical absorption method (for example, an amine absorbent (for example, using (absorbent such as N-methyldiethanolamine: MDEA)) and a physical absorption method (for example, using Selexol absorbent using polyethylene glycol dimethyl ether) have been suggested.

Incidentally, in the case of a system such as an integrated coal gasification combined cycle (IGCC) technique, there are demands as follows.

1) In a power generation system, in order to set the discharge of $SO_X$ as air pollutants to a level less than a regulation value, it is necessary to remove $H_2S$ that is a generation source of $SO_X$. Meanwhile, since there is an effect of enhancing the power generation efficiency, it is desirable that $CO_2$ should not be recovered as much as possible.

2) A small flow rate of recovered $H_2S$-containing gas (off-gas) and a high $H_2S$ density are advantageous for the case of manufacturing chemical products from the recovered gas and the case of processing $H_2S$, and it is desirable to be able to selectively recover $H_2S$.

3) In a system that combines the CO shift and CCS (recovery and storage of carbon dioxide) in the IGCC, it is necessary to suppress the $H_2S$ density in $CO_2$ recovered by the $CO_2$ recovery process approximately to a specified value (for example, 10 to 20 ppm).

4) In order to improve the power generation efficiency, the amount of use of heat energy such as steam is preferably as small as possible.

That is, it is required to efficiently and selectively separate $H_2S$ from the gas containing $CO_2$ and $H_2S$ in terms of thermal energy.

Therefore, conventionally, there has been a suggestion of an energy-saving process which supplies a part of the absorbent, in which dissolved components are partly dissipated in a pressure discharge vessel (regenerator upper stage), from the lower part of the uppermost part of the absorber (Patent Literature 1).

The technique of Patent Literature 1 is effective in the case of being applied to the $CO_2$ recovery from the gas containing no $H_2S$. However, in the case of being applied to the selective recovery of $H_2S$ from the gas containing $CO_2$ and $H_2S$, the $H_2S$ density in the absorbent in the lower part of the absorber increases, and the $H_2S$ absorption rate is greatly reduced. Accordingly, there is a problem in that the $H_2S$ removal ratio and the $H_2S$ selectivity are lowered, and in order to obtain the desired removal ratio, on the contrary, an increase in thermal energy is caused.

Thus, the inventors have previously suggested a technique which extracts a part of the absorbent from the middle of the absorption portion of the absorber and supplies the absorbent, which absorbs $CO_2$ and $H_2S$ at a relatively low density, to the middle of a regeneration portion of the regenerator (Patent Literature 2).

CITATION LIST

Patent Literature

Patent Literature 1: Japanese Patent Application Laid-open No. 2010-120013
Patent Literature 2: Japanese Patent Application Laid-open No. 2012-110835

SUMMARY

Technical Problem

In the suggestion of Patent Literature 2, although it is possible to improve the selective absorptivity of $H_2S$ and reduce the regenerative heat energy consumption compared to a conventional process by about 10%, there is a problem in that the device cost and the number of heat exchangers increase and the system cost increases.

Thus, there is an earnest desire for an appearance of a system that is capable of efficiently and selectively separating $H_2S$ in terms of thermal energy from the gas containing $CO_2$ and $H_2S$ apart from the absorption of $CO_2$ in the chemical absorption process, and achieves the cost reduction.

In view of the above-mentioned problems, an object of the present invention is to provide a recovery system and a recovery method of a gas containing $CO_2$ and $H_2S$ that efficiently recover $H_2S$ contained in the gasified gas obtained by gasifying, for example, the coal, the biomass or the like by a gasification furnace.

Solution to Problem

According to a first aspect of the present invention in order to the above-mentioned problems, there is provided a system for recovering a gas containing $CO_2$ and $H_2S$, including: an absorber which brings an introduction gas into contact with an absorbent absorbing $CO_2$ and $H_2S$ so as to absorb $CO_2$ and $H_2S$ from the introduction gas, the introduction gas containing $CO_2$ and $H_2S$; an absorbent regenerator which extracts the absorbent, which has absorbed $CO_2$ and $H_2S$ from a bottom portion of the absorber, introduces the absorbent from a top portion side via a first supply line, and releases $CO_2$ and $H_2S$ by the heat of a reboiler so as to regenerate the absorbent; a second supply line which returns the regenerated absorbent to the absorber; a third supply line which extracts the absorbent, which has absorbed a part of $CO_2$ and $H_2S$ from the vicinity of a middle stage of the absorber, and introduces the extracted absorbent to the vicinity of the middle stage of the regenerator; and a heat exchanger which is interposed at an intersection between the third supply line and the second supply line so as to perform the heat exchange between the absorbent, which has absorbed $CO_2$ and $H_2S$ extracted from the vicinity of the middle stage of the absorber, and the regenerated absorbent.

According to a second aspect of the present invention, there is provided a method for recovering a gas containing $CO_2$ and $H_2S$ using an absorber and a regenerator which recovers $CO_2$ and $H_2S$ from an introduction gas containing $CO_2$ and $H_2S$, the method including: extracting a part of the absorbent from the vicinity of a middle stage of the absorber which absorbs $CO_2$ and $H_2S$ from the introduction gas so as to reduce a flow rate of the absorbent flowing down below the absorber; and introducing the absorbent extracted from a bottom portion from the vicinity of the top portion of the regenerator, and introducing the absorbent extracted from the vicinity of a middle stage of the absorber into the vicinity of the middle stage of the regenerator so as to regenerate the absorbent, wherein the absorbent, which has absorbed $CO_2$ and $H_2S$ extracted from the vicinity of the middle stage of the absorber is heat-exchanged with the regenerated absorbent regenerated by the regenerator.

Advantageous Effects of Invention

In accordance with the present invention, by reducing the flow rate of the absorbent flowing down below the absorber so as to extract a part of the absorbent from the vicinity of the middle stage of the absorber by a third supply line, it is possible to lower the $CO_2$ absorption amount without substantially lowering the absorption amount of $H_2S$, to improve the selective separation characteristics of $H_2S$, and to reduce the reboiler heat capacity in the regenerator.

DESCRIPTION OF EMBODIMENTS

The present invention will be described in detail below with reference to the accompanying drawings. The present invention is not to be limited to the examples. In addition, constituent elements in the examples include those that can be easily assumed by a person skilled in the art or those that are substantially identical.

First Example

Figure 1:
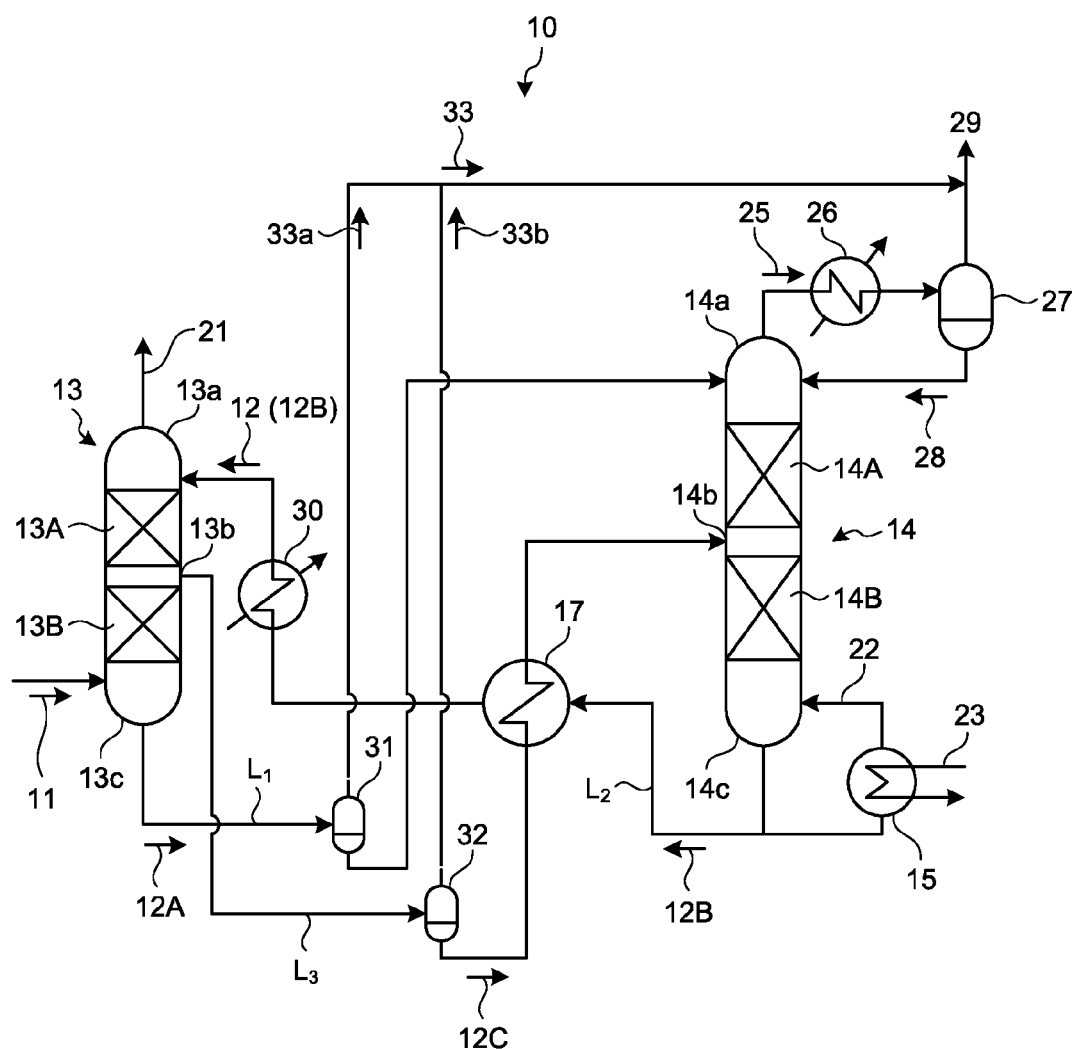
FIG. 1 is a schematic diagram of a recovery system of a gas containing $CO_2$ and $H_2S$ according to a first embodiment.

A recovery system of a gas containing $CO_2$ and $H_2S$ according to an example of the present invention will be described with reference to the drawings. FIG. 1 is a schematic diagram of a recovery system of a gas containing $CO_2$ and $H_2S$ according to the first example.

As illustrated in FIG. 1, a recovery system 10 of the gas containing $CO_2$ and $H_2S$ according to this example includes an absorber 13 which uses a gasified gas containing $CO_2$ and $H_2S$ obtained from a gasification furnace for gasifying, for example, the coal, the biomass or the like, as an introduction gas 11, and brings the introduction gas 11 into contact with an absorbent 12 which absorbs $CO_2$ and $H_2S$ to absorb $CO_2$ and $H_2S$ from the introduction gas 11; an absorbent regenerator (hereinafter, referred to as a "regenerator") 14 which extracts an absorbent (rich solution) 12A, which has absorbed $CO_2$ and $H_2S$ from a bottom portion 13c of the absorber 13, introduces the absorbent from a top portion 14a via a first supply line $L_1$, and releases $CO_2$ and $H_2S$ by the heat of a reboiler 15 to regenerate the absorbent 12; a second supply line $L_2$ which discharges a regenerated absorbent (lean solution) 12B from a bottom portion 14c of the regenerator 14 and returns the regenerated absorbent to a top portion 13a of the absorber 13; a third supply line $L_3$ which extracts an absorbent (semi-rich solution) 12C which has absorbed a part of $CO_2$ and $H_2S$ from the vicinity of a middle stage 13b of the absorber 13, and introduces the extracted semi-rich solution 12C to the vicinity of a middle stage 14b of the regenerator 14; and a semi-rich solution heat exchanger 17 which is interposed at an intersection between the third supply line $L_3$ and the second supply line $L_2$ to perform the heat exchange between the semi-rich solution 12C and the lean solution 12B.

In this system, $CO_2$ and $H_2S$ are removed in the regenerator 14 and the regenerated absorbent (lean solution) 12B is reused as the absorbent 12.

In a purifying method using the recovery system 10 of the gas containing $CO_2$ and $H_2S$, the gasified gas obtained in the gasification furnace for gasifying the coal, the biomass, or the like is sent to a gas cooling device (not illustrated), is cooled here by the cooling water and is introduced into the absorber 13 as the introduction gas 11.

Filling portions 13A, 13B are provided inside the absorber 13 to improve the countercurrent contact efficiency of the introduction gas 11 and the absorbent 12, when passing through the filling portions 13A, 13B. In addition, a plurality of filling portions may be provided, and the countercurrent contact between the introduction gas 11 and the absorbent 12 may be performed, for example, by a spray method, a liquid column method, a tray method or the like other than the filling method.

In the absorber 13, the introduction gas 11, for example, comes into countercurrent-contact with the amine-based absorbent 12, $CO_2$ and $H_2S$ in the introduction gas 11 are absorbed by the absorbent 12 by a chemical reaction, and purified gas 21 from which $CO_2$ and $H_2S$ are removed is discharged out of the system. The absorbent 12 which absorbs $CO_2$ and $H_2S$ is also referred to as "rich solution" 12A. The rich solution 12A is supplied to the top portion 14a side of the absorbent regenerator 14 without heat exchange via a rich solution pump (not illustrated), while keeping the low temperature.

When the rich solution 12A introduced from the top portion 14a side is introduced into the regenerator from the vicinity of the top portion 14a of the regenerator 14 having filling portions 14A and 14B by a spraying means (not illustrated) or the like and flows down in the regenerator, the rich solution 12A generates an endothermic reaction due to water vapor 22 from the reboiler 15, and discharges and regenerated most of $CO_2$ and $H_2S$. The absorbent 12, which has released a part or the most of $CO_2$ and $H_2S$ in the absorbent regenerator 14, is referred to as "semi-lean solution". When reaching the lower part of the regenerator 14, the semi-lean solution becomes the absorbent in which substantially all of $CO_2$ and $H_2S$ have been removed. The absorbent regenerated by substantially all of $CO_2$ and $H_2S$ are removed is referred to as "lean solution" 12B. The lean solution 12B is indirectly heated by saturated water vapor 23 in the reboiler 15, generates the water vapor 22, and is returned to the bottom portion 14c side of the regenerator 14.

Further, $CO_2$ and $H_2S$ gas 25 accompanied by water vapor released from the rich solution 12A and the semi-lean solution in the regenerator is derived from the top portion 14a of the regenerator 14, the water vapor is condensed by a condenser 26, water 28 is separated by a separation drum 27, and $CO_2$ and $H_2S$ gas 29 is released and recovered to the outside of the system. The water 28 separated by the separation drum 27 is supplied to the top portion 14a of the absorbent regenerator 14.

The regenerated absorbent (lean solution) 12B is cooled by being heat-exchanged with the semi-rich solution 12C by the semi-rich solution heat exchanger 17, the pressure thereof is subsequently increased in a lean solvent pump (not illustrated), and after the regenerated absorbent is cooled by a lean solvent cooler 30, it is supplied to the absorber 13 again and is reused as the absorbent 12.

In this example, a part of the absorbent 12 is extracted from the vicinity of the middle stage 13b below the uppermost stage of the absorber 13 by the third supply line $L_3$. In addition, the extraction amount is adapted to measure the temperature, the pressure, the flow rate, the $CO_2$ density, the $H_2S$ density or the like of the introduction gas to be introduced, and collectively determine these conditions, thereby determining an optimum extraction position and extraction amount.

The extracted semi-rich solution 12C is heated by heat exchange with the high-temperature lean solution 12B extracted from the bottom portion 14c of the regenerator 14 by the semi-rich solution heat exchanger 17, and is supplied downward from the vicinity of the middle stage 14b of the regenerator 14, and more preferably, from the middle stage 14b.

Incidentally, $CO_2$ in the introduction gas 11 is absorbed by the absorbent 12 together with $H_2S$ within the absorber 13.

As in the present invention, by reducing the flow rate of the absorbent flowing down below the absorber 13 so as to extract a part of the absorbent from the vicinity of the middle stage 13b of the absorber 13 by the third supply line $L_3$, since the mass transfer of the gas side is dominant in $H_2S$ and the mass transfer of the liquid side is dominant in $CO_2$, the absorption rate of $CO_2$ is further lowered.

Thus, as the $CO_2$ absorption amount is lowered, that is, the $CO_2$ density in the absorbent is lowered, the absorption amount of $H_2S$ increases.

Even in consideration of a decrease in the $H_2S$ absorption amount due to a decrease in the flow rate of the absorbent 12, the $H_2S$ absorption amount hardly decreases.

Therefore, it is possible to improve the selectivity of $H_2S$.

By introducing the rich solution 12A having the high $CO_2$ and $H_2S$ density from the top portion 14a of the regenerator 14 without heat exchange, and by supplying the semi-rich solution 12C having relatively lower $CO_2$ and $H_2S$ density than the rich solution 12A to the vicinity of the middle stage 14b of the regenerator 14 or to the lower side thereof after heating by the semi-rich solution heat exchanger 17, it is possible to reduce the heating capacity of the reboiler 15. Thus, it is possible to reduce the water vapor consumption due to the reboiler 15.

In addition, in this example, the rich solution 12A and the semi-rich solution 12C extracted from the absorber 13 are introduced to each of flash drums 31, 32 to separate non-condensable gas 33 (33a, 33b) such as $N_2$, $H_2$ and CO here. Also, the non-condensable gas is joined with the $CO_2$ and $H_2S$ gas 29 separated by the separation drum 27.

Figure 2:
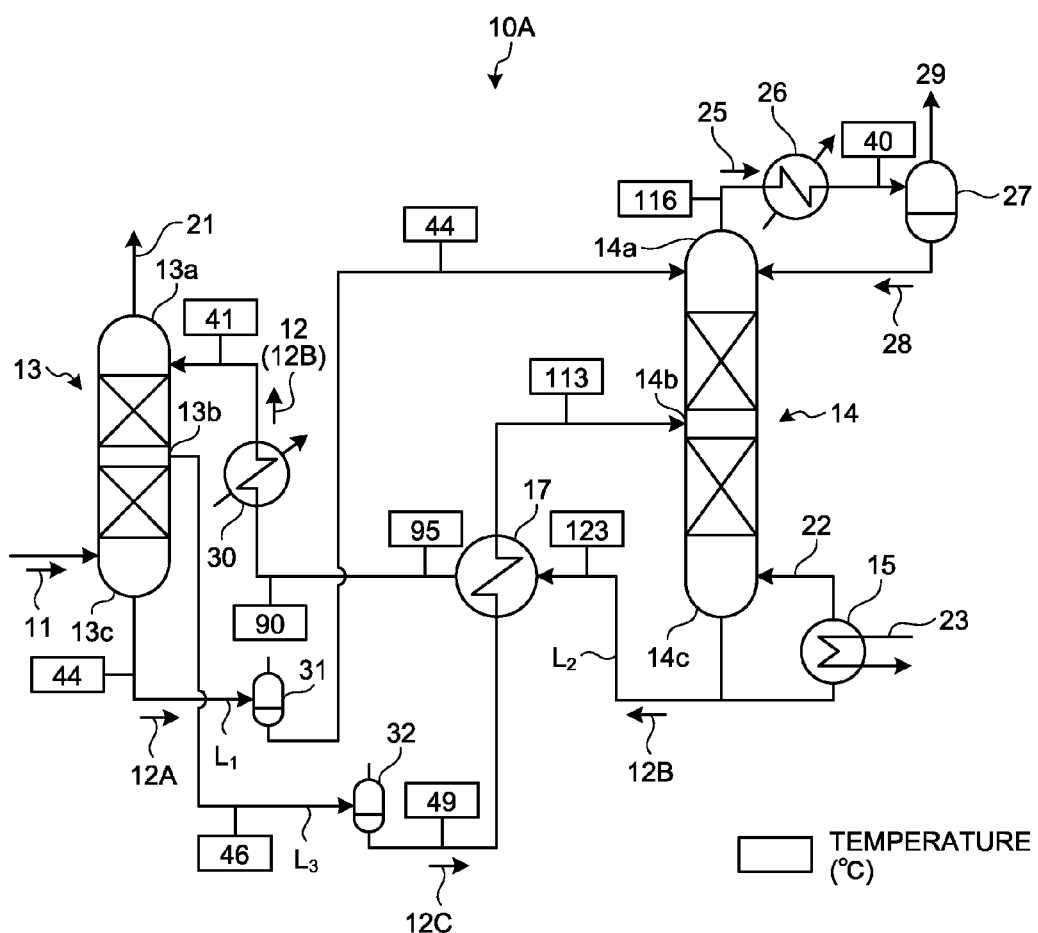
FIG. 2 is a schematic diagram in which an example of a temperature condition of the recovery system of the gas containing $CO_2$ and $H_2S$ according to the first example is added.

FIG. 2 is a schematic diagram in which an example of a temperature condition of the recovery system of the gas containing $CO_2$ and $H_2S$ according to the first example is added. In FIG. 2, a square frame indicates the temperature.

As illustrated in FIG. 2, in a recovery system 10A of the gas containing $CO_2$ and $H_2S$, the introduction gas 11 is introduced into the absorber 13. The absorbent 12 (lean solution 12B) is introduced into the absorber so as to face it and absorbs $CO_2$ and $H_2S$.

Since the absorption is an exothermic reaction, the semi-rich solution 12C extracted from the vicinity of the middle stage 13b of the absorber 13 is 46° C. Meanwhile, the rich solution 12A extracted from the bottom portion 13c is 44° C.

The rich solution 12A is introduced from the top portion 14a of the regenerator 14 as it is, while keeping a temperature of 44° C., without the heat exchange.

In contrast, the semi-rich solution 12C is heat-exchanged with the high-temperature (123° C.) lean solution 12B in the semi-rich solution heat exchanger 17, and the semi-rich solution 12C becomes 113° C. and is introduced from the vicinity of the middle stage 14b of the regenerator 14. In addition, the temperature of the $CO_2$ and $H_2S$ gas 25 accompanied by the water vapor from the top portion 14a of the regenerator 14 is 116° C., and the temperature thereof after passing through the condenser 26 is 40° C.

Thus, a reduction in the reboiler heating capacity of the reboiler 15 in the regenerator 14 is achieved.

Figure 3:
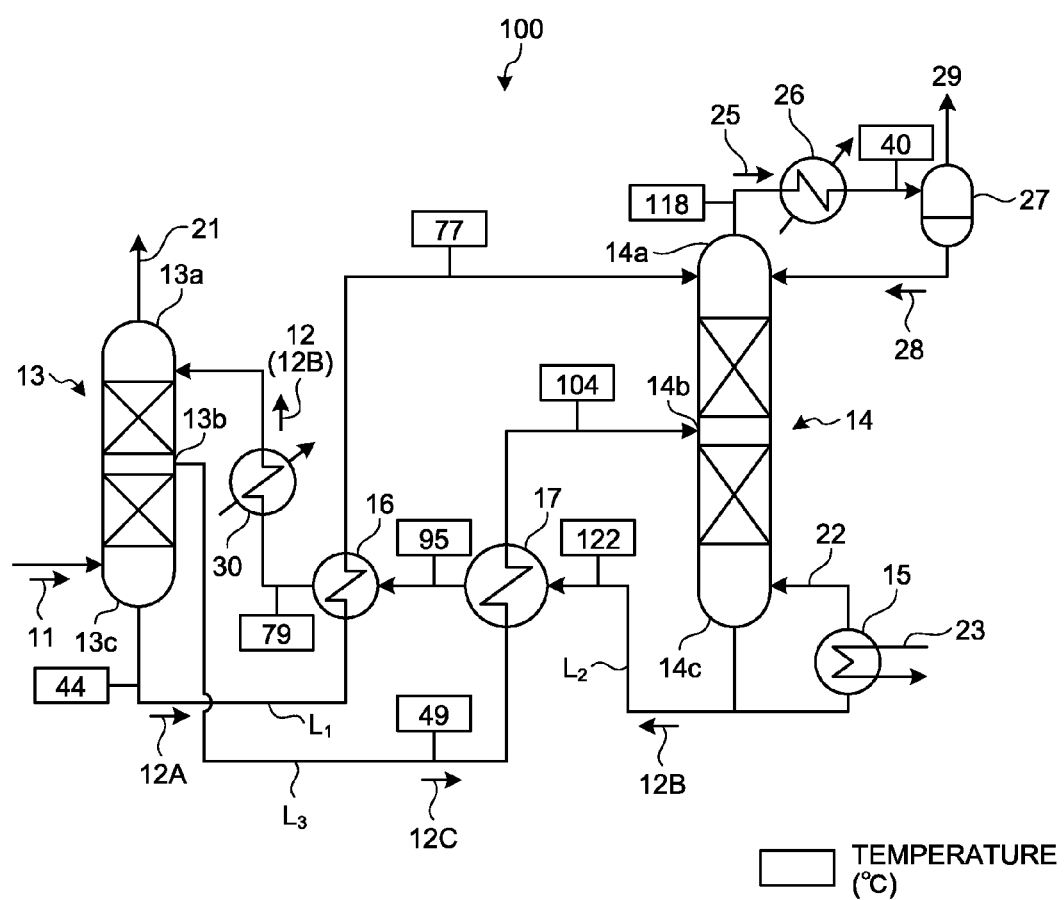
FIG. 3 is a schematic diagram in which an example of a temperature condition of the recovery system of the gas containing $CO_2$ and $H_2S$ according to a conventional example is added.

FIG. 3 is a gas recovery system of the related art (Patent Literature 2).

As illustrated in FIG. 3, in a recovery system 100 of the gas containing $CO_2$ and $H_2S$, the rich solution 12A extracted from the bottom portion 13c of the absorber 13 is adapted to be introduced from the top portion 14a side of the regenerator 14 after heat-exchange in a rich solution heat exchanger 16.

Here, in the recovery system 100 of the gas containing $CO_2$ and $H_2S$ illustrated in FIG. 3, the introduction gas 11 is introduced into the absorber 13. The absorbent 12 (lean solution 12B) is introduced into the absorber so as to face the introduction gas 11, and absorbs $CO_2$ and $H_2S$.

Since this absorption is an exothermic reaction, the semi-rich solution 12C extracted from the vicinity of the middle stage 13b of the absorber 13 is 49° C. Meanwhile, the rich solution 12A extracted from the bottom portion 13c is 44° C.

The rich solution 12A and the semi-rich solution 12C are heat-exchanged in series in the rich solution heat exchanger 16 and the semi-rich solution heat exchanger 17 by the high-temperature (122° C.) lean solution 12B, respectively, and the rich solution 12A becomes 77° C. and is introduced from the top portion 14a of the regenerator 14. Also, the semi-rich solution 12C becomes 104° C. and is introduced from the vicinity of the middle stage 14b of the regenerator 14. The temperature of $CO_2$ and $H_2S$ gas 25 accompanied by water vapor from the top portion 14a of the regenerator 14 is 118° C., and the temperature thereof after passing through the condenser 26 is 40° C.

Table 1 is a comparison of the load of the reboiler 15 of each regenerator, the load of the rich solution heat exchanger 16, the load of the semi-rich solution heat exchanger 17 and the load of the condenser 26, in the recovery system of the example and the gas recovery system of first and second conventional examples.

In the first conventional example (Patent Literature 2), the rich solution 12A and the semi-rich solution 12C are heat-exchanged with the lean solution 12B in the rich solution heat exchanger 16 and the semi-rich solution heat exchanger 17.

In the second conventional example, the rich solution 12A is heat-exchanged with the lean solution 12B in the rich solution heat exchanger 16.

TABLE 1

| Load | Present Example | First Conventional Example | Second Conventional Example |
|---|---|---|---|
| Rebolier (15) | 1.09 | 1 | 1.33 |
| Heat exchanger (16) | — | 1 | 1.94 |
| Heat exchanger (17) | 1 | 1 | — |
| Cooler (26) | 0.67 | 1 | 1.18 |

As illustrated in Table 1, in the recovery system of this example, it was possible to reduce the reboiler load as compared to the second conventional example.

Also, it was possible to significantly suppress the load of the condenser 26 which cools the $CO_2$ and $H_2S$ gas 25 accompanied by the water vapor discharged from the regenerator 14 compared to the first and second conventional examples.

Also, it was possible to reduce the cost and improve the heat balance of the overall process reduce, by eliminating the heat exchanger from the first conventional example.

REFERENCE SIGNS LIST

10, 10A, 100 RECOVERY SYSTEM OF GAS CONTAINING $CO_2$ AND $H_2S$
11 INTRODUCTION GAS
12 ABSORBENT
12A RICH SOLUTION
12B LEAN SOLUTION
12C SEMI-RICH SOLUTION
13 ABSORBER
14 ABSORBENT REGENERATOR (REGENERATOR)
15 REBOILER
17 SEMI-RICH SOLUTION HEAT EXCHANGER

The invention claimed is:

1. A method for recovering a gas containing CO2 and H2S using an absorber and a regenerator, the method comprising:
   extracting a semi-rich solution which has absorbed a part of CO2 and H2S contained in an introduction gas from the vicinity of a middle stage of the absorber to be introduced into the vicinity of a middle stage of the regenerator;
   extracting a rich solution which has absorbed CO2 and H2S contained in the introduction gas from a bottom portion of the absorber to be introduced into the vicinity of a top portion of the regenerator;
   separating a non-condensable gas including N2, H2 and CO contained in the semi-rich solution in a first flash drum prior to introduction into the vicinity of the middle stage of the regenerator, and separating a non-condensable gas including N2, H2 and CO contained in the rich solution in a second flash drum prior to introduction into the vicinity of the top portion of the regenerator;
   heat-exchanging the semi-rich solution with a lean solution regenerated by removing CO2 and H2S contained in the semi-rich solution and the rich solution in the regenerator;
   cooling water vapor accompanied by CO2 and H2S gas released from the regenerator with a condenser to condense the water vapor into water;
   separating the water and the CO2 and H2S gas in a separation drum; and
   joining the CO2 and H2S separated in the separation drum and the non-condensable gas separated in the first and second flash drums.

* * * * *